*INVENTOR*
ALBERT W. VINAL

*BY* Ralph R Barnard
*ATTORNEY*

United States Patent Office 3,193,807
Patented July 6, 1965

3,193,807
ELECTRICAL SAMPLING SWITCH

Albert W. Vinal, Owego, N.Y., assignor to International Business Machines Corporation, New York, N.Y., a corporation of New York Filed Dec. 30, 1960, Ser. No. 79,721
6 Claims. (Cl. 340—174)

This invention relates generally to digital storage systems and more particularly to electrical sampling switch means for converting stored information to serial digital information using active elements.

There are many engineering compromises which have to be made in selecting the type of storage unit for an electronic digital system requiring a memory function. One consideration is the access time required to transfer information from the storage for use in the system. When a storage system is used wherein it is possible to have access to any given unit of binary digital information represented by one or more digits at any particular time, the memory system is classified as being of the "random access type." One example of the memory which is of the random access type is the toroidal core memory where each core is arranged along X, Y, and Z coordinates so that coincident energization of two or more conductors enables a determination of the nature of the binary information stored in that element. While such a memory system has the substantial advantage that its contents at any particular or several locations may be readily attainable at any instant, the toroidal magnetic core memory has a shortcoming that the information stored at the particular location is destroyed during the reading operation. Therefore, it is classified as a destructive type memory.

By way of contrast, the storage of binary digital information on magnetic tracks of a revolving drum is of the nondestructive type because the passage of the record track under the reading head does not destroy the information recorded thereon unless additional erasing means is specifically utilized. While the magnetic drum as a storage device has the desirable feature of being nondestructive, it does not have the desirable characteristic of being of the random access type because information cannot be read from the record track until that track has moved under a reading head. While the toroidal core matrix and the magnetic drum are not the only known digital memory devices, they are representative of two classes of memories with respect to these two desirable features of operation.

Another desirable feature for a digital memory would be that the binary digital information stored thereon is available in either serial form or in parallel form, or a combination of the two in accordance with the particular computer system in which the digital memory is operating. Whether a computer system is designed to handle the binary coded digital information in parallel or serial form or a combination thereof is in itself a matter of engineering compromise determined by the particular computer environment. For example, serial operation usually requires less equipment and a longer time to perform a particular operating function and parallel operation requires a greater amount of equipment and less time to perform a particular function of operation. Basically, the toroidal core matrix memory is of the parallel read-out type because random access to a particular digital information with a minimum of address drive requires addressing a whole word at a time. Also, the addressing for purposes of interrogation of each bit of a word stored in a toroidal core memory matrix results in the destruction of the stored magnetic condition. Therefore, the information which must be read out in parallel, is stored in a temporary register for writing the same information back in the memory.

Conversely, the magnetic drum which is not random access in operation is of the type that the information must be read out in either serial or serial parallel but never completely in parallel. The reason that the magnetic drum cannot be used to simultaneously read-out separate bits of a binary digital unit of information from separate tracks is based on the inability to accurately align plural heads each on a separate track. Thus, neither the magnetic drum nor the magnetic toroidal core coordinate matrix type memory satisfy the highly desirable operational capability of being susceptible to either parallel or serial or serial parallel read-out of digits of binary coded digital information in a random access nondestructive memory environment.

While it has been known in the prior art for a substantial period that the toroidal core as a memory element had a nondestructive type counter part known as the transfluxor type device, that device has not been recognized as being usable in a matrix array for the purpose of providing a three-dimensional random access nondestructive memory susceptible to parallel, serial parallel, or serial read-out as the particular application required. Based on the teachings of the prior art, it was not known that a magnetic memory was economically susceptible to anything except a parallel type read-out technique.

Co-pending patent application "Magnetic Memory System," Serial No. 79,722, filed December 30, 1960, of the same inventor and assigned to the same assignee of the present application, describes and claims means including electrical sampling transformer switch means for economically converting digital information stored in the random access nondestructive memory to serial binary information during the read-out operation. The present application describes an active element electrical sampling switch usable in the overall system and described in the above-identified co-pending application in place of the transformer switch.

It is therefore the primary object of the present invention to provide new and improved active element electrical sampling switch means for converting stored information to serial digital information.

It is another object of the present invention to provide a new and improved means for electrically sampling plural nondestructive information elements wherein the gating pulses act to initiate both the necessary selectivity and the mixing function.

It is a further object of the present invention to provide a new and improved electrical sampling switch means for converting stored information to serial digital information wherein selective gating voltage pulses do not destroy or obscure the small signal being detected.

It is an additional object of the present invention to provide a new and improved electrical sampling switch means for converting stored information to serial digital information wherein the sampling switch amplifies the signal being detected.

The objects of the present invention are provided by applying the output from each sensing means associated with each nondestructive information element to a bi-gain amplifier having an output which is applied to one input of an AND circuit and constructing the bi-gain amplifier to normally be in its high gain condition except where a voltage gate is being applied thereto via another terminal so that the amplifier is not only non-responsive to its signal input but applies an input voltage level to the AND circuit. As a result by applying a voltage gate to all of the bi-gain amplifiers, except the one selected to pass the signal present on an associated sense winding, and repeating this in a sequential fashion so that each amplifier is in turn allowed to remain in its high gain condition, the sensing means associated with each nondestructive information element is sampled and the stored information is converted to serial form.

The foregoing and other objects, features and advantages of the invention will be apparent from the following more particular description of a preferred embodiment of the invention, as illustrated in the accompanying drawings.

In the drawings:

FIGS. 1*a* and 1*b* show an exemplary individual nondestructive memory element in the blocked and unblocked condition, respectively, which enables one to practice the teachings of the present invention. The element in itself forms no part of the teachings of the present invention;

Figures 1A, 1B:
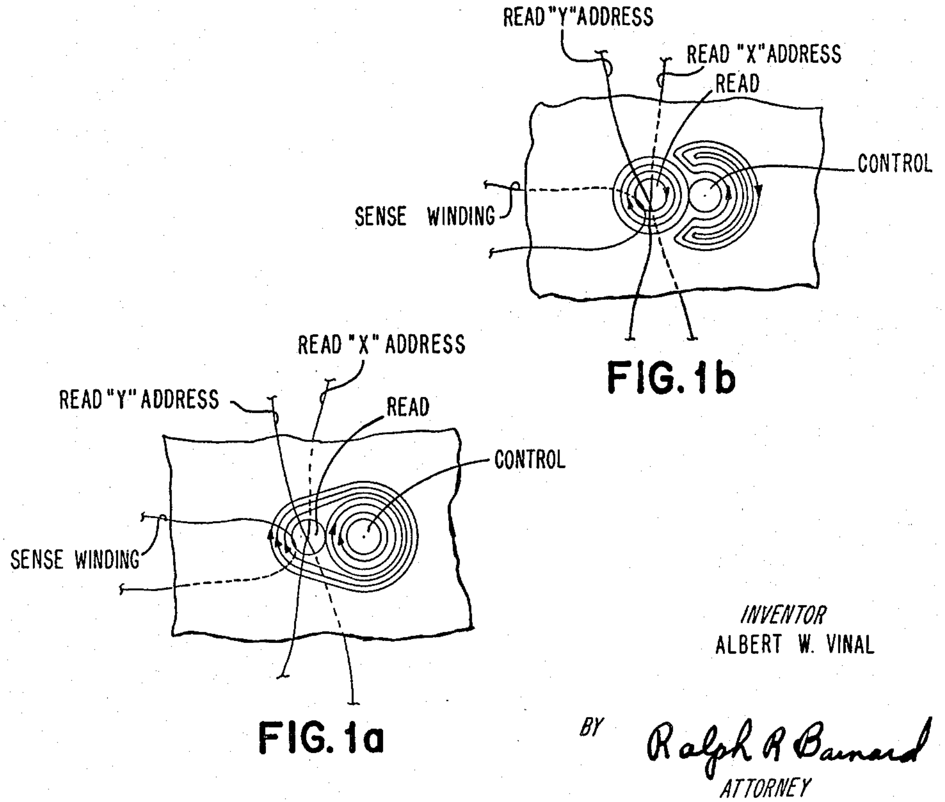

Referring again to FIGS. 1*a* and 1*b*, there is shown a nondestructive memory element which is utilized in a memory system of a preferred embodiment according to the teachings of the present invention. The memory element comprising two apertures and the magnetic material surrounding them is an improved transfluxor type device and the subject matter of a co-pending application, Serial Number 823,525, "Magnetic Devices," filed June 29, 1959, now abandoned, and assigned to the same assignee as the present invention. That co-pending application describes the operation of the memory element in great detail. However, inasmuch as the present invention is concerned with reading binary digital information from a memory made up of these elements, it is desirable that the reading operation of this device be described herein. FIG. 1*a* shows the two-apertured memory element in its blocked condition representing a binary 0. The aperture on the left functions as the read aperture, and the aperture on the right functions as the control aperture. By means not shown, the control aperture is used to place the magnetic material around the read aperture in a blocked condition by deriving a magnetomotive force which orients the flux on both sides of the read aperture in the same direction as shown.

Consequently, when coincident current pulses of normal operating amplitudes are applied to both the read X address and read Y address conductors, sufficient magnetomotive force will not be generated in the magnetic material adjacent the read aperture to reverse the flux around that aperture because the path length over which the magnetomotive force must be effective includes the path extending around the control aperture. Since no flux (or very little) is reversed around the read aperture, no voltage is induced in the sense winding and the two-apertured magnetic element has been demonstrated to be in the blocked or binary 0 condition.

FIG. 1*b* shows the same aperture pair in the unblocked or binary 1 condition. Since changing the binary condition of the aperture pair forms no part of the present invention, no means are shown to apply the control magnetomotive force to the magnetic material around the control aperture for switching from the blocked to the unblocked condition. However, it should be noted that the magnetic flux adjacent the read aperture are now in reverse directions and the effective path length with respect to the read aperture is now along the inner wall thereof. Therefore, the coincident current pulses of normal operating amplitudes being applied to the read X address and the read Y address conductors will be sufficient to reverse the flux around the read aperture and induce a voltage in the sense winding thereby demonstrating that an unblocked condition or binary 1 is stored in the two-apertured memory element.

Figure 2:
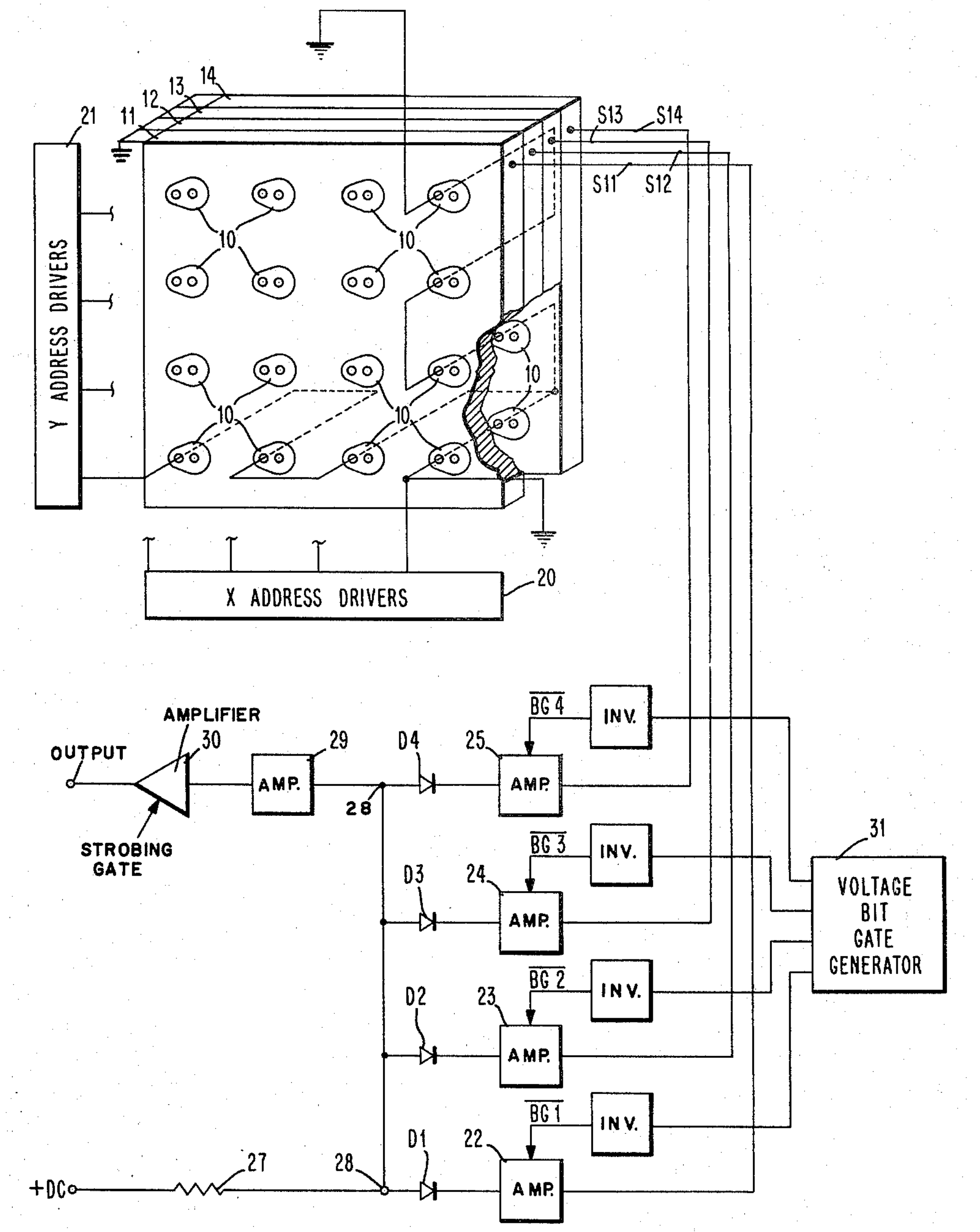
FIG. 2 shows a block diagram of a memory system utilizing the electrical sampling switch of the present invention to provide the serial read-out of stored information.

When it is desired to make a random access memory comprising elements operating in accordance with FIGS. 1*a* and 1*b*, the elements may be arranged in plural planes for X and Y coordinate addressing. FIG. 2 shows such an array. Therein plural apertured memory elements 10, such as described in FIGS. 1*a* and 1*b*, are arranged in plural planes 11, 12, 13, and 14. By way of example, if the two-apertured memory elements 10 of plane 11 represent the first bit of 16 binary words, then the corresponding two-apertured memory elements in the adjacent planes represent the second, third, and fourth bits in each of the 16 binary words. This three-dimensional array of magnetic elements is merely exemplary of practical embodiments. It is, of course, expected that the number of bits in any binary word may be substantial, for example, 24, 32, etc. In those instances, a like number of memory planes would be utilized. Moreover, while 16 two-apertured memory elements 10 are shown in a given plane, the number which will be utilized in a practical embodiment will vary greatly in accordance with the word capacity of the memory.

One of the essentials of a memory system is that the amount of addressing equipment be limited. One of the ways of economizing is to utilize the X and Y coordinate addressing conductors to select read aperture storing the first bit of a binary word within the first plane and at the same time pass the same conductors through the read aperture of all the elements with a corresponding X and Y coordinate position in all the other planes representing the bits or the other orders of significance defining a digital word. Thus, all of the bits of a unit of binary digital information, such as a word are addressed simultaneously by the same X and Y read address conductors. This fact led to the requirement of parallel read-out from a toroidal core matrix because the memory element was of the destructive read-out type.

In order not to unnecessarily complicate the description of the present invention, only one X and Y coordinate read address conductor is shown. For example, the single Y address read conductor shown passes through the read aperture of the apertured memory element 10 in the lower left hand corner of plane 11; thence through the read aperture of all the corresponding memory elements 10 in planes 12, 13, and 14 from front to back; thence through all the memory elements 10 of the adjacent row having the same Y coordinate from back to front, etc. Following this technique, the Y read address conductor passes through the read aperture of the memory elements 10 of each plane in the lower right hand corner from back to front and is grounded as shown.

Similarly, the single X address read conductor shown, passes through the read aperture of the apertured memory element 10 in the lower right hand corner of plane 11; thence through the read aperture of all the corresponding memory elements 10 in planes 12, 13, and 14 from front to back; thence through all the memory elements 10 of the adjacent row having the same X coordinate from back to front, etc. Following this technique, the X read address conductor passes through the read aperture of the memory elements 10 of each plane in the upper right hand corner from back to front and is grounded as shown.

While only a single read address conductor is shown being appropriately energized by conventional X address drivers 20, it should be noted that there will be an X read conductor for each row of two-apertured memory elements along the X coordinate. Similarly, only a single Y read address conductor is shown being appropriately energized by Y address drivers 21 even though a Y address conductor will be required for every column of two-apertured memory elements along the Y axis. It is essential that X address drivers and the Y address drivers be able to provide repetitive bipolar pulses to selected X and Y read address conductors. Such driver means are well-known. By way of example, the driver system disclosed in U.S. Patent No. 2,988,732 describes an address system which may be used for both the X address drivers 20 and the Y address drivers 21. Other means are known by those skilled in the art.

Figure 3:
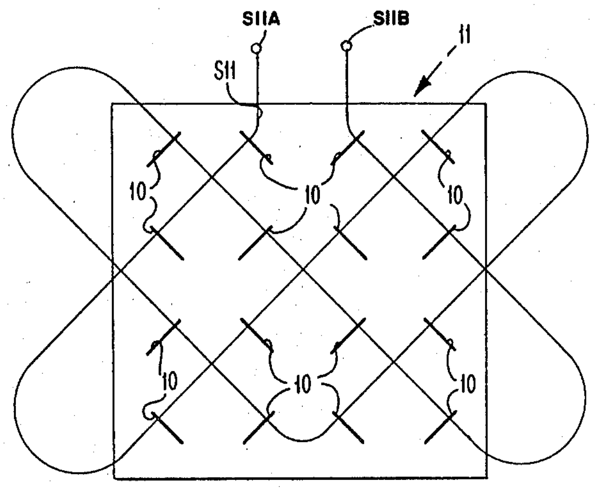
FIG. 3 shows the arrangement of the sense winding passing through all of the nondestructive memory elements in a single plane.

The two-apertured device of FIGS. 1*a* and 1*b*, when arranged in core planes as shown in FIG. 2, must include a single sense winding threading each of the read apertures of each of the two-apertured memory elements within the memory plane. FIG. 3 shows an arrangement of two-apertured memory elements 10 within a plane according to X and Y coordinates. Therein a single sense winding S11 is passed through the read aperture of each two-apertured element in a particular plane exemplified by plane 11 of FIG. 2. It will be noted that the sense winding S11 passes through half of the two-apertured memory elements in one direction and half of the two-apertured memory elements in the other direction. Such an arrangement of a sense winding with itself is conventional and has for a purpose the canceling of the half address noise induced in the sense winding when it passes through memory elements which are not fully addressed for read out. As shown, sense winding S11 has two output terminals S11*a* and S11*b*.

Referring back to FIG. 2, one terminal of each of the sense windings S11, S12, S13 and S14 is shown as grounded. Assuming that the X and Y read address conductors shown are coincidentally addressed, each of the two-apertured memory elements 10 in the lower right hand corner of planes 11, 12, 13, and 14 will be interrogated to determine the binary condition being stored in each. Had each of these two-apertured memory elements been of the destructive read-out type, it would have been necessary to sample the outputs from the sense windings S11, S12, S13, and S14 to determine the binary coded digital information stored in each so that it may be utilized in the computer system and/or written back into that location of the memory. Because sense windings S11, S12, S13, and S14 had to be sampled simultaneously, magnetic core memories operating on a three-dimensional X and Y coordinate addressing scheme were considered to be inherently of the parallel read-out type. This meant that a separate sense amplifier had to be operatively associated with each sense winding and memory plane for simultaneous detection of this parallel information. Moreover, parallel read-out meant that a separate temporary storage register had to be maintained in the output and responsive to the plural sense amplifier to store the binary information being read out. Of course, when it was desired to write the information back in the memory at the same or other locations, this temporary storage register (having the number of storage positions commensurate with the number of memory planes and binary bits being read out in parallel) was used as a source for the input information.

It was recognized by the applicant, that since the two-apertured memory elements 10 being coincidentally addressed through the read aperture could be of the non-destructive type, it was no longer necessary and mandatory to read out the information from sense windings S11, S12, S13, and S14 in parallel, because the information stated being interrogated continued to be available. Therefore, if it were desired to serialize the binary information stored in the two-apertured memory elements in the lower right hand corner of core planes 11, 12, 13, and 14, it was only necessary to repetitively address X and Y location and successively sample, at the same frequency, sense windings S11, S12, S13, and S14.

Since each of the two-apertured memory elements in the lower right-hand corner of planes 11, 12, 13, and 14 may be repetitively coincidentally read addressed (with a signal or zero signal being simultaneously derived within each sense winding S11, S12, S13, and S14 as a result of each repetitive addressing operation in accordance with the stored binary information) the digital information stored in each element may be serialized by successively connecting each of the sense windings to a single output channel. This successive connection may in turn be provided by the cooperation of a separate bi-gain amplifier with one input of an AND circuit for each of the sense windings associated with the two-apertured memory elements. Specifically, note that sense winding S11 is connected through bi-gain amplifier 22 to one input of AND circuit 26; sense winding S12 is connected through bi-gain amplifier 23 to another input of AND circuit 26; sense winding S13 is connected through bi-gain amplifier 24 to another input of AND circuit 26; and sense winding S14 is connected through bi-gain amplifier 25 to another input of AND circuit 26.

As shown, AND circuit 26 is of conventional positive logic construction and is comprised of summing resistor 27 and diodes D1, D2, D3 and D4. According to conventional operation, output terminal 28 of AND circuit 26 remains at a low level until each of the inputs applied to the other terminals of D1, D2, D3 and D4 are raised to an up level so that any one of the diodes will no longer act to clamp output terminal 28 to the voltage level of any of the inputs. In the absence of a voltage gate pulse applied to each of the bi-gain amplifiers 22, 23, 24 or 25 by the corresponding bit gate sources BG1, $\overline{BG2}$, $\overline{BG3}$ or $\overline{BG4}$, each of the amplifiers will be in a normal high voltage gain condition such that the signal derived in the sense winding connected thereto is amplified and applied to the corresponding AND circuit input. However, according to the teachings of the present invention, when it is desired to sense the signal being applied to amplifier 22 by S11, no voltage gate is applied by $\overline{BG1}$ while a voltage gate is applied to bi-gain amplifiers 23, 24 and 25 by $\overline{BG2}$, $\overline{BG3}$ and $\overline{BG4}$.

According to the particular construction of the bi-gain amplifiers as described hereinafter in connection with FIG. 4 the application of voltage gate to the bi-gain amplifier will not only lower the voltage gain of that amplifier, but will also apply an up voltage level to the output of the amplifier and the correspoding input of the AND circuit. Thus, under the conditions described, diodes D2, D3 and D4 will be receiving an up voltage level as a result of the voltage gate being applied to amplifiers 23, 24 and 25 while amplifier 22 (which is not receiving a voltage gate), will be in its high voltage gain condition so that a positive voltage signal present in S11 will be passed through AND circuit 26 and raise the voltage level of output terminal 28 thereof in accordance therewith.

During a succeeding time period $\overline{BG2}$ will be in the down level and $\overline{BG1}$, $\overline{BG3}$ and $\overline{BG4}$ will be in the up voltage level so that bi-gain amplifier 23 is in its high voltage condition while each of the other amplifiers 22, 24 and 25 are merely providing up voltage levels to condition AND circuit 26 to respond to whatever signal sense winding 12 is applying thereto via amplifier 23 in its high gain condition. During the next succeeding time period, $\overline{BG1}$, $\overline{BG2}$, and $\overline{BG4}$ will be in the up voltage level and $\overline{BG3}$ will be in the down voltage level so that amplifier 24 is conditioned to pass whatever signal is in sense winding S13 while amplifiers 22, 23 and 25 merely act to condition AND circuit 26. Similarly, on the next succeeding time period when $\overline{BG1}$, $\overline{BG2}$ and $\overline{BG3}$ are providing up voltage level gates to their associated amplifiers, and amplifier 25 is maintained in its high gain condition, the signal derived in sense winding S14 is applied through amplifier 25 to the corresponding input of AND circuit 26 and provide an appropriate signal at output terminal 28.

Thus, bi-gain amplifiers in cooperation with the voltage bit gates being received act to seqeuntially select the sense windings for sampling while AND circuit 26 acts to connect the several sources to a common channel (the output terminal 28 of AND circuit 26). The output terminal of AND circuit 26 is then connected to differential amplifier 29 which rejects common mode noise signals being read from the selected sense winding while at the same time amplifying the differential voltage signal. Moreover, conventional strobing gate 30 connected to the output of differential amplifier 29 provides a means for rejecting differential noise existing adjacent in time with the desired signal.

Voltage gate generator 31 may be of conventional construction and undoubtedly will be the part of the bit gate generation means of the computer system of which the electrical sampling switch of the present invention is a part. Because it is desired that a voltage gate be applied to each of the non-selected amplifiers, to drive them to a low gain condition and apply enough voltage to the corresponding input of the AND circuit and at the same time not apply a voltage gate to the selected amplifier, it is necessary that the output of the bit gate generator be inverted as shown. In a practical usage of the present invention the inverted bit gates will usually be readily available in the bit gate generated means. However, conventional inverters may be readily utilized when this is not true.

Figure 4:
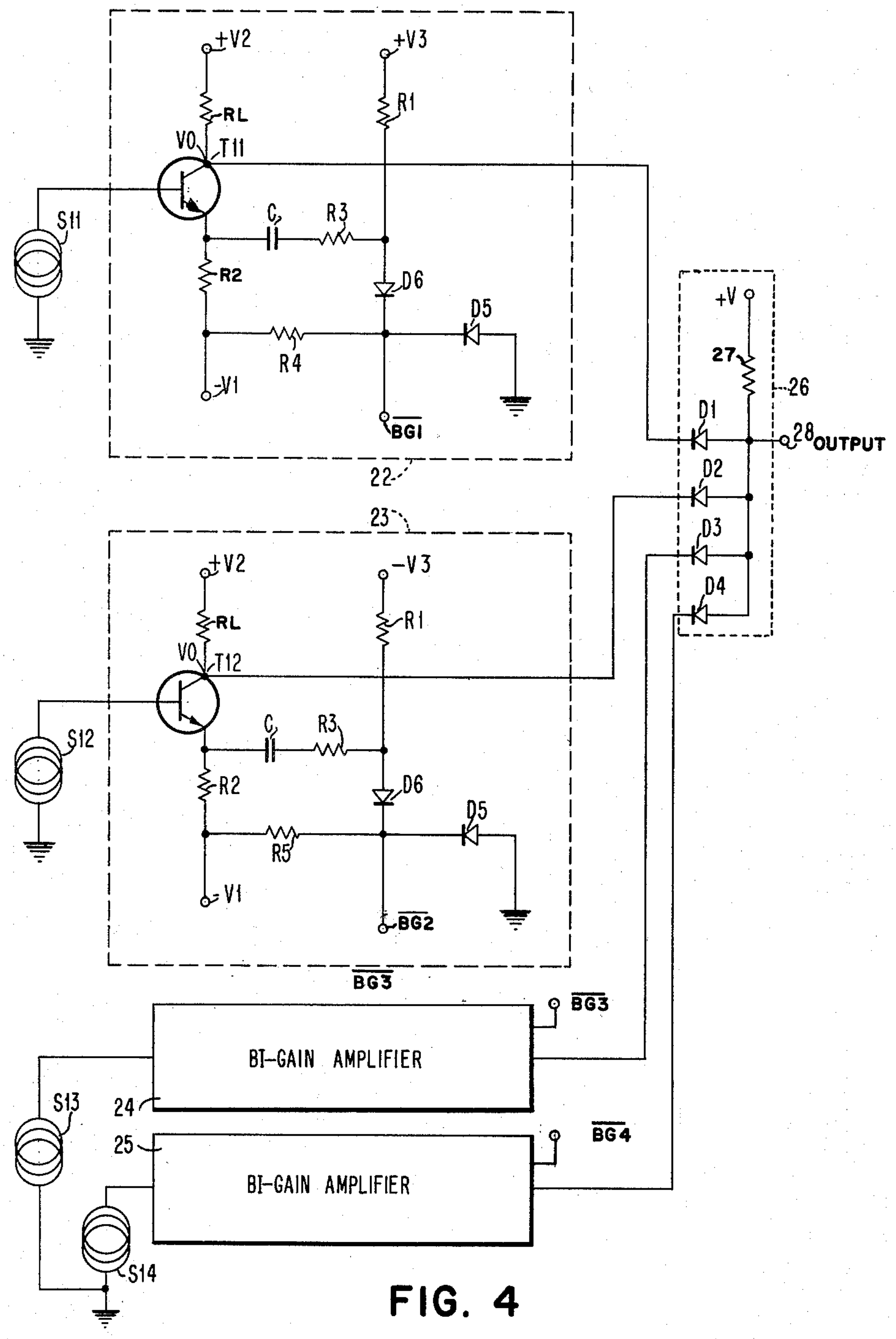
FIG. 4 shows the detailed circuitry of the bi-gain amplifier electrical sampling switch according to the present invention.

Referring now to FIG. 4 two of the bi-gain amplifiers 22 and 23 associated with sense windings S11 and S12 are shown in detail for the purpose of describing the construction and the operation thereof with respect to the system. Since each of these amplifiers are identical in construction and operation in and of themselves, the same identification numerals are utilized whenever possible. When a transistor such as T11 of amplifier 22 or T12 of amplifier 23 are connected in a common emitter configuration, as shown, its A.C. signal voltage gain between the base and collector may be determined by an equation as follows:

$$G \simeq \frac{\alpha R_L}{R_E} \quad (1)$$

Where:

G represents voltage gain from base input to collector output; $\alpha$ represents the common base current amplification factor of the transistor;

$R_L$ represents the load resistance connected between the collector of the transistor and A.C. ground; and $R_E$ represents the resistance between the emitter of the transistor and A.C. ground Referring specifically to amplifier 22 of FIG. 4, when a down voltage level gate is being applied by $\overline{BG1}$, Equation 1 in a more detailed form may be represented as follows:

$$G_{high} \simeq \frac{\alpha R_L}{R_3 + r_{f1} + r_{f2}} \quad (2)$$

Where:

$r_{f1}$=forward impedance of diode D6
$r_{f2}$=forward impedance of diode D5 and
$R_3$=resistance of resistor R3

When $\overline{BG1}$ is in its down voltage level, diodes D6 and D5 are forward biased and R3 and the diodes form a low resistance path to ground much smaller than the resistance of R2. R2 is connected between the emitter of T11 and voltage source V1. Each of the D.C. bias voltage sources always are at A.C. ground. Voltage source V3, voltage source V1, resistance value of R4 and resistance value of R1 are selected so that the diodes D6 and D5 are placed in their forward bias condition in the absence of an up voltage level from $\overline{BG1}$. Since R3 and the forward resistance of diodes D6 and D5 are small, their summation is small and the voltage gain ratio represented by Equation 2 is large. Accordingly, the amplifier is in its normal high gain condition.

Moreover, the voltage level $V_0$ of the collector of T11 may be represented by the following equation:

$$V_0 = V2 - \frac{\alpha V1 R_L}{R2} \quad (3)$$

Where:

R2 is the magnitude of the resistance connected between the emitter of T11 and voltage supply V1.

By choosing each of the circuit parameters making up Equation 3 the voltage level of the collector during its high gain condition may be determined to be virtually independent of the selection of the transistor T11 since $\alpha$ in near unity.

Whenever it is desired to gate the amplifier 22 to its low gain condition, an up voltage level is applied by $\overline{BG1}$. This voltage level is of a proper magnitude to back bias both D6 and D5 which are normally forward biased and Equation 2 herein above is modified as follows:

$$G_{low} = \frac{\alpha(R_L + R2 + R3)}{R1(R3 + R2)} \quad (4)$$

Under these conditions and since each of the bias voltage sources are at A.C. ground, R2 is connected in parallel with a series circuit of R3 and R1. The denominator at the right hand side of Equation 4 is then comparatively large with respect to the numerator and the voltage gain G is relatively low.

During the low gain condition represented by Equation 4 it is necessary according to the teachings of the present invention that the voltage level of the collector of T11 be raised to a value which would provide an adequate input voltage level to diode D1 of AND circuit 26 consisting of diode D1. The amplitude of this voltage level change of the collector is determined by the drop in the emitter current of resistor T11 which is initiated by the back biasing of diodes D6 and D5. The amount by which this current drops is equal to the current that was formerly flowing through resistor R1 and diode D6 before the application of the up voltage level by $\overline{BG1}$. This is true, because looking into the emitter of transistor T11, it operates as a voltage source and in order for the sum of currents at the emitter to be zero when there is a large charging current applied to capacitor C, the emitter current must be decreased. The current through R2 cannot be increased since the voltage applied thereacross remains the same. The level of the voltage of the collector of T11 may be determined by the following equation:

$$V_0 = \frac{\alpha V3 R_L}{R1 + R3} \quad (5)$$

The value of capacitor C must be such that the following relationship exists:

$$(R1 + R3)C >> T_G \quad (6)$$

Where:

$T_G$=duration of the up voltage level from the bit gate source.

Also, the choice of capacitor C should satisfy the following relationship:

$$C > \frac{1}{2\pi f R3} \quad (7)$$

Where:

$f$=lowest frequency component of the signal being sensed from the sense winding.

One exemplary criterion for the proper operation of this electrical sampling switch is that the amplitude of the voltage on the collector of transistor T12 and the collector of the transistor of amplifiers 24 and 25 during the low amplification condition must be larger than the signal voltage being applied to the base of the transistor T11 times the high voltage gain factor $G_{high}$ of Equation 2 when it is desired to sample sense winding S11. If this is not the case, the voltage signal being selected by the amplifier 22 in its high gain condition will have its positive peak clipped when passing through the AND circuit 26.

It is also essential that the signal modulation of the voltage level at the collector of the transistor amplifier in its low gain condition be small compared to the magnitude of that voltage. The aforementioned conditions may be obtained by the proper selection of the circuit parameters utilized to construct the bi-gain amplifiers.

It should be clear that while semiconductors have been used in the bi-gain amplifiers that a similar bi-gain amplifier may be constructed with tubes connected as cathode followers without departing from the teachings of the present invention. Moreover, it should be clear that any information of bi-gain amplifiers can be utilized with plural inputs of a single AND circuit as required by the particular circuit application of the teachings of the present invention. While the AND circuit 26 has been shown as constructed of passive devices, it should be clear that active elements may be used in place of the diodes and the AND circuit modified in accordance therewith.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electrical digit storage system comprising a plurality of non-destructive informamtion storage elements arranged in a storage array, means for reading multi-bit digital information units from said array, a plurality of sensing means coupled to said array for transmitting the multi-bit information unit upon readout, said sensing means including a separate sensing circuit for each bit of said information unit, electrical sampling switch means connected to said sensing means for the purpose of serializing the bits making up said information unit, said electrical sampling switch means comprising plural bi-gain amplifier means corresponding in number to the sensing circuits, each said amplifier means having a signal input terminal, a gate input terminal, and a signal output terminal, said bi-gain amplifiers each having a high gain condition wherein it is effective to transmit signals applied to the signal input terminal thereof to its signal output terminal and a low gain condition wherein it is effective to provide a predetermined constant output signal at its signal output terminal, each separate sensing circuit being coupled to the signal input terminal of one of said amplifiers, a logical AND circuit having a number of inputs equal in number to said bi-gain amplifiers, each said input of said logical AND circuit being connected to the signal output terminal of one of said amplifiers, the constant output signals of said amplifiers in their low gain condition constituting sufficient enabling signals for said logical AND circuit, separate control means coupled to the gate input terminal of each said amplifier normally providing a control signal for maintaining the associated amplifier in the low gain condition, means for sequentially operating said control means to switch one amplifier at a time in a predetermined sequence to its high gain condition while the other amplifiers are in their low gain conditions, the logical AND circuit operating to pass whatever signals are being supplied to the signal input terminal of the amplifier which is in the high gain condition so that for each sequential switching of an amplifier to its high gain condition a signal representing one bit of said information unit is derived from said logical AND circuit.

2. The invention defined in claim 1 wherein the control means coupled to each of said amplifiers comprises an inverter circuit and the control signals which maintain said amplifiers in low gain condition are signals supplied by said inverter circuits when no input is received thereby and wherein said means for sequentially operating the control means comprises generator means for sequentially supplying input to said inverter circuits.

3. The electrical digital system as set forth in claim 1 wherein each of said bi-gain amplifiers comprise a single transistor having a collector base and emitter connected in a common emitter configuration, said emitter being connected to an impedance network having two values of impedance, a low impedance corresponding to said high gain condition, a high impedance corresponding to said low gain condition, diode switching means responsive to an input to said gate input terminal to switch from said high gain condition to said low gain condition, a high voltage being generated on said collector during said high gain condition, said high voltage of said collector providing an input to said AND circuit.

4. An electrical sampling switch comprising a plurality of bi-gain amplifier means each having a signal input and a signal output, each said bi-gain amplifier having a high gain condition wherein it is effective to transmit signals applied to the signal input thereof to its signal output and a low gain condition wherein it is effective to provide a predetermined constant output signal at the output thereof, logical AND circuit having an input coupled to the signal output of each of said bi-gain amplifier means and having a single output, the constant output signals of said bi-gain amplifier in their low gain conditions constituting sufficient enabling signals for said logical AND circuit, means for normally maintaining each of said bi-gain amplifiers in its low gain condition and for sequentially switching said bi-gain amplifiers one at a time to the high gain condition, the logical AND circuit operating to pass whatever signals are being supplied to the input of the bi-gain amplifier which is in the high gain condition.

5. An electrical sampling switch comprising plural bi-gain amplifier means, each said amplifier means having a signal input terminal, a gate input terminal, and a signal output terminal, said bi-gain amplifiers each having a high gain condition wherein it is effective to transmit signals applied to the signal input terminal thereof to its signal output terminal and a low gain condition wherein it is effective to provide a predetermined constant output signal at its signal output terminal, a logical AND circuit having a number of inputs equal in number to said bi-gain amplifiers, each said input of said logical AND circuit being connected to the signal output terminal of one of said amplifiers, the constant output signals of said amplifiers in their low gain condition constituting sufficient enabling signals for said logical AND circuit, separate control means coupled to the gate input terminal of each said amplifier normally providing a control signal for maintaining the associated amplifier in the low gain condition, means for sequentially operating said control means to switch one amplifier at a time in a predetermined sequence to its high gain condition while the other amplifiers are in their low gain conditions, the logical AND circuit operating to pass whatever signals are being supplied to the signal input terminal of the amplifier which is in the high gain condition.

6. The invention defined in claim 5 wherein the control means coupled to each of said amplifiers comprises an inverter circuit and the control signals which maintain said amplifiers in low gain condition are signals supplied by said inverter circuits when no input is received thereby and wherein said means for sequentially operating the control means comprises generator means for sequentially supplying input to said inverter circuits.

References Cited by the Examiner

UNITED STATES PATENTS

| | | | |
|---|---|---|---|
| 2,815,448 | 12/57 | Filipowsky | 328—147 |
| 2,933,689 | 4/60 | Johnson | 307—88.5 |
| 2,985,769 | 5/61 | Blount | 307—88.5 |
| 3,001,100 | 9/61 | Schuh | 307—88.5 |
| 3,007,056 | 10/61 | Logue et al. | 307—88.5 |

ARTHUR GAUSS, *Primary Examiner.*

JOHN F. BURNS, *Examiner.*